(12) United States Patent
Garland et al.

(10) Patent No.: US 8,243,083 B1
(45) Date of Patent: *Aug. 14, 2012

(54) SYSTEM, METHOD, AND COMPUTER PROGRAM PRODUCT FOR CONVERTING A SCAN ALGORITHM TO A SEGMENTED SCAN ALGORITHM IN AN OPERATOR-INDEPENDENT MANNER

(75) Inventors: Michael J. Garland, Lake Elmo, MN (US); Shubhabrata Sengupta, Davis, CA (US)

(73) Assignee: NVIDIA Corporation, Santa Clara, CA (US)

( * ) Notice: Subject to any disclaimer, the term of this patent is extended or adjusted under 35 U.S.C. 154(b) by 805 days.

This patent is subject to a terminal disclaimer.

(21) Appl. No.: 12/333,255

(22) Filed: Dec. 11, 2008

Related U.S. Application Data (63) Continuation-in-part of application No. 11/950,245, filed on Dec. 4, 2007.

(51) Int. Cl.
*G06F 15/80* (2006.01)

(52) U.S. Cl. ........ 345/505; 345/419; 345/501; 345/506; 712/2; 712/10

(58) Field of Classification Search .................. 345/505, 345/420, 419, 418, 501, 427, 426, 423, 421, 345/629; 382/240, 154, 107, 125; 712/30, 712/22; 707/1, 2, 7, 102, 3, 705, 765, 104.1
See application file for complete search history.

(56) References Cited

U.S. PATENT DOCUMENTS

| | | | |
|---|---|---|---|
| 4,628,483 A | 12/1986 | Nelson | |
| 4,855,937 A * | 8/1989 | Heartz | ............... 345/421 |
| 5,193,207 A | 3/1993 | Vander Vegt et al. | |
| 5,274,718 A | 12/1993 | Leonardi et al. | |
| 5,594,844 A | 1/1997 | Sakai et al. | |
| 5,621,908 A | 4/1997 | Akaboshi et al. | |
| 5,650,862 A | 7/1997 | Shimizu et al. | |
| 5,963,212 A | 10/1999 | Bakalash | |
| 6,065,005 A | 5/2000 | Gal et al. | |
| 6,489,955 B1 | 12/2002 | Newhall, Jr. | |
| 6,518,971 B1 | 2/2003 | Pesto, Jr. et al. | |
| 6,556,200 B1 | 4/2003 | Pfister et al. | |
| 6,825,839 B2 | 11/2004 | Huang et al. | |
| 6,879,980 B1 | 4/2005 | Kothuri et al. | |
| 7,146,486 B1 | 12/2006 | Prokopenko et al. | |

(Continued)

FOREIGN PATENT DOCUMENTS

WO 2007082042 A2 7/2007

(Continued)

OTHER PUBLICATIONS

U.S. Appl. No. 11/862,938, filed Sep. 27, 2007.

(Continued)

*Primary Examiner* — James A Thompson
*Assistant Examiner* — Abderrahim Merouan
(74) *Attorney, Agent, or Firm* — Zilka-Kotab, PC (57) ABSTRACT

A system, method, and computer program product are provided for converting a scan algorithm to a segmented scan algorithm in an operator independent manner. In operation, a scan algorithm and a limit index data structure are identified. Utilizing the limit index data structure, the scan algorithm is converted to a segmented scan algorithm in an operator-independent manner. Additionally, the segmented scan algorithm is performed to produce an output.

22 Claims, 5 Drawing Sheets

U.S. PATENT DOCUMENTS

| | | | |
|---|---|---|---|
| 7,194,125 | B2 | 3/2007 | Vlasic et al. |
| 7,348,975 | B2 | 3/2008 | Reshetov et al. |
| 7,580,927 | B1 | 8/2009 | Abugov et al. |
| 7,616,782 | B2 | 11/2009 | Badawy |
| 7,903,125 | B1 | 3/2011 | Ayers et al. |
| 8,065,288 | B1 | 11/2011 | Garland et al. |
| 2003/0028509 | A1 | 2/2003 | Sah et al. |
| 2004/0210596 | A1 | 10/2004 | Budd et al. |
| 2005/0001844 | A1 | 1/2005 | Naegle |
| 2005/0177564 | A1 | 8/2005 | Kobayashi et al. |
| 2007/0159488 | A1 | 7/2007 | Danskin et al. |
| 2007/0165035 | A1 | 7/2007 | Duluk, Jr. et al. |
| 2007/0169042 | A1 | 7/2007 | Janczewski |
| 2007/0182732 | A1 | 8/2007 | Woop et al. |
| 2007/0260663 | A1* | 11/2007 | Frigo et al. .................. 708/490 |
| 2007/0264023 | A1 | 11/2007 | Gorrell et al. |
| 2008/0043018 | A1 | 2/2008 | Keller et al. |
| 2008/0316214 | A1 | 12/2008 | Peeper |
| 2009/0089542 | A1 | 4/2009 | Laine et al. |
| 2009/0106530 | A1 | 4/2009 | Lauterbach et al. |
| 2009/0132878 | A1 | 5/2009 | Garland et al. |
| 2010/0076941 | A1 | 3/2010 | Dotsenko et al. |

FOREIGN PATENT DOCUMENTS

| | | | |
|---|---|---|---|
| WO | 2008127610 | A2 | 10/2008 |
| WO | 2008127622 | A2 | 10/2008 |
| WO | 2008127623 | A2 | 10/2008 |

OTHER PUBLICATIONS

U.S. Appl. No. 11/950,245, filed Dec. 4, 2007.
Sengupta et al., "Data-Parallel GPU Computing," May 31, 2008.
G. Blelloch, Vector Models for Data-Parallel Computing, MIT Press, 1990.
S. Sengupta, M. Harris, Y. Zhang, J. D. Owens, Scan primitives for GPU computing, in: Graphics Hardware 2007, ACM, 2007.
M. Harris, S. Sengupta, J. D. Owens, Parallel prefix sum (scan) with CUDA, in: H. Nguyen (ed.), GNU Gems 3, chap. 39, Addison Wesley, 2007, pp. 851-876.
G. E. Blelloch, Programming parallel algorithms, Commun. ACM 39 (3) (1996) 85-97.
G. E. Blelloch, S. Chatterjee, J. C. Hardwick, J. Sipelstein, M. Zagha, Implementation of a portable nested data-parallel language, Journal of Parallel and Distributed Computing 21 (1) (1994) 4-14.
S. Chatterjee, G. E. Blelloch, M. Zagha, Scan primitives for vector computers, in: Supercomputing '90: Proceedings of the 1990 Conference on Supercomputing, 1990.
P. B. Gibbons, A more practical pram model, in: SPAA '89: Proceedings of the first annual ACM symposium on Parallel algorithms and architectures, ACM, New York, NY, USA, 1989.
J. Hensley, T. Scheuermann, G. Coombe, M. Singh, A. Lastra, Fast summed-area table generation and its applications, Computer Graphics Forum 24 (3) (2005) 547-555.
W. D. Hillis, J. Guy L. Steele, Data parallel algorithms, Commun. ACM 29 (12) (1986) 1170-1183.
D. Horn, Stream reduction operations for GPGPU applications, in: M. Pharr (ed.), GPU Gems 2, chap. 36, Addison Wesley, 2005, pp. 573-589.
K. E. Iverson, A Programming Language, Wiley, New York, 1962.
E. Lindholm, J. Nickolls, S. Oberman, J. Montrym, NVIDIA Tesla: A unified graphics and computing architecture, IEEE Micro 28 (2) (2008) 39-55.
Y. D. N. K. G. P.-P. S. C. B. J. Manferdelli, Fast scan algorithms on graphics processors, in: Proc. Int'l Conference on Supercomputing, ACM, 2008. 27.
J. Nickolls, I. Buck, M. Garland, K. Skadron, Scalable parallel programming with CUDA, Queue 6 (2) (2008) 40-53.
NVIDIA Corporation, NVIDIA CUDA Programming Guide, version 1.1 (Nov. 2007).
J. T. Schwartz, Ultracomputers, ACM Transactions on Programming Languages and Systems 2 (4) (1980) 484-521.
S. Sengupta, A. E. Lefohn, J. D. Owens, A work-efficient step-efficient prefix sum algorithm, in: Proceedings of the Workshop on Edge Computing Using New Commodity Architectures, 2006.
J. A. Stratton, S. S. Stone, W. mei Hwu, M-CUDA: An efficient implementation of CUDA kernels on multi-cores, IMPACT Technical Report IMPACT-08-01, UIUC (Feb. 2008).
Chinese Office Action from Application No. 200810172720.0 dated Apr. 8, 2011.
Chinese Office Action from Application No. 200810145892.9 dated Apr. 15, 2010.
Chinese Office Action from Application No. 200810172720.0 dated Jun. 25, 2010.
German Office Action from Application No. 10-2008-031998.8 dated Mar. 9, 2010.
Notice of Reasons for Rejection from Japanese Application No. 2008263158 dated Jun. 8, 2011.
Notice of Final Rejection from Japanese Application No. 2008263158 dated Nov. 16, 2010.
Notice of Preliminary Rejection from Korean Application No. 10-2008-0113250 dated Dec. 17, 2010.
Notice of Preliminary Rejection from Korean Patent Application No. 10-2008-0113250 dated May 28, 2010.
Notice of Preliminary Rejection from Korean Patent Application No. 10-2008-0094936 dated Feb. 26, 2010.
Advisory Action from U.S. Appl. No. 11/862,938 dated Aug. 23, 2010.
Final Office Action from U.S. Appl. No. 11/862,938 dated Jun. 9, 2010.
Final Office Action from U.S. Appl. No. 11/927,099 dated Jun. 1, 2011.
Final Office Action from U.S. Appl. No. 11/927,159 dated May 26, 2011.
Final Office Action from U.S. Appl. No. 11/938,091 dated Oct. 14, 2010.
Final Office Action from U.S. Appl. No. 11/940,782 dated Sep. 16, 2010.
Final Office Action from U.S. Appl. No. 11/942,608 dated Apr. 29, 2011.
Final Office Action from U.S. Appl. No. 11/942,608 dated May 10, 2010.
Final Office Action from U.S. Appl. No. 11/950,245 dated May 25, 2011.
Non-Final Office Action from U.S. Appl. No. 11/862,938 dated Dec. 1, 2009.
Non-Final Office Action from U.S. Appl. No. 11/927,099 dated Oct. 4, 2010.
Non-Final Office Action from U.S. Appl. No. 11/927,159 dated Sep. 17, 2010.
Non-Final Office Action from U.S. Appl. No. 11/938,091 dated Mar. 2, 2010.
Non-Final Office Action from U.S. Appl. No. 11/940,782 dated May 20, 2010.
Non-Final Office Action from U.S. Appl. No. 11/942,608 dated Nov. 4, 2010.
Non-Final Office Action from U.S. Appl. No. 11/942,608 dated Dec. 18, 2009.
Non-Final Office Action from U.S. Appl. No. 11/950,193 dated Feb. 3, 2011.
Non-Final Office Action from U.S. Appl. No. 11/950,245 dated Oct. 5, 2010.
Advisory Action from U.S. Appl. No. 11/942,608 dated Jul. 18, 2011.
Lauterbach, C. et al., U.S. Appl. No. 11/927,099, filed Oct. 29, 2007.
Lauterbach, C. et al., U.S. Appl. No. 11/927,159, filed Oct. 29, 2007.
Garland, M. et al., U.S. Appl. No. 11/938,091, filed Nov. 9, 2007.
Rajagopalan, N. et al., U.S. Appl. No. 11/942,608, filed Nov. 19, 2007.
Garland, M. et al., U.S. Appl. No. 11/950,193, filed Dec. 4, 2007.
Arvo et al., "Fast Ray Tracing by Ray Classification," ACM, Computer Graphics, Jul. 1987, vol. 21, No. 4, pp. 55-64.
Blelloch, Guy E., "Prefix Sums and Their Applications," Carnegie Mellon University School of Computer Science, CMU-CS-90-190, Nov. 1990, pp. 1-23.
Gottschalk et al., "OBBTree: A Hierarchical Structure for Rapid Interference Detection," ACM, Proceedings of the 23rd Annual Conference on Computer Graphics and Interactive Techniques, 1996, vol. 30, pp. 171-180, New York, NY.

Gunther et al., "Realtime Ray Tracing on GPU with BVH-based Packet Traversal," IEEE, Eurographics Symposium on Interactive Ray Tracing 2007, Sep. 10-12, 2007, pp. 1-6.

Havran et al., "Efficient Sorting and Searching in Rendering Algorithms," The Eurographics Association, Version 1.1, Eurographics 2006 Tutorial T4, Aug. 31, 2006, pp. 1-74.

Havran, Vlastimil, "Heuristic Ray Shooting Algorithms," Dissertation Thesis, Nov. 30, 2000, pp. i-xiv and pp. 1-206, Prague.

Horn et al., "Interactive k-D Tree GPU Raytracing," ACM, Proceedings of the 2007 Symposium on Interactive 3D Graphics and Games, 2007, pp. 167-174, New York, NY.

Kamel et al., "On Packing R-Tress," Carnegie Mellon University School of Computer Science, 1993, pp. 1-20.

Miyashita et al., "An Algorithm for Computing Prefix Sum on a Reconfigurable Array," Academic Journal, Transactions of the Institute of Electronics, Information and Communication Engineers (IEICE) D-I, Jun. 8, 2010, vol. J77-D-I, No. 10, pp. 703-711, Japan.

Naishlos et al., "Towards a First Vertical Prototyping of an Extremely Fine-Grained Parallel Programming Approach," ACM, Proceedings of the Thirteenth Annual ACM Symposium on Parallel Algorithms and Architectures, 2001, pp. 93-102, New York, NY.

Pascucci et al., "Global Static Indexing for Real-Time Exploration of Very Large Regular Grids," ACM, Nov. 2001, pp. 1-8.

Popov et al., "Stackless KD-Tree Traversal for High Performance GPU Ray Tracing," Eurographics 2007, The Eurographics Association and Blackwell Publishing, 2007, vol. 26, No. 3, pp. 415-424.

Reshetov et al., "Multi-Level Ray Tracing Algorithm," ACM Transactions on Graphics (TOG)-Proceedigns of ACM SIGGRAPH 2005, Jul. 2005, vol. 24, Issue 3, pp. 1176-1185, New York, NY.

Roger et al. "Whiffed Ray-Tracing for Dynamic Scenes using a Ray-Space Hierarchy on the GPU," Eurographics Symposium on Rendering, Jun. 2007, pp. 99-110.

Sato et al., "Implementing the PRAM Algorithms in the Multithread Architecture and Evaluating the Performance," Information Processing Society of Japan (IPSJ), SIG Notes '98 (28), Mar. 20, 1998, pp. 39-46, Japan.

Thinking Machines Corporation, Connection Machine Model CM-2 Technical Summary, Version 6.0, Nov. 1990, pp. iii-vii and pp. 1-110 USA.

Wachter, C. et al., Instant Ray Tracing: The Bounding Interval Hierarchy, Eurographics Symposium on Rendering (2006), The Eurographics Association, 2006, pp. 139-149, Germany.

Wald et al., "Interactive Rendering with Coherent Ray Tracing," Computer Graphics Forum, vol. 20 (2001), No. 3, Eurographics 2001, pp. 153-164.

Wald, Ingo, "On Fast Construction of SAH-based Bounding Volume Hierarchies," IEEE Symposium on Interactive Ray Tracing, 2007, pp. 33-40, IEEE Computer Society, Washington DC.

Wald, I., "Realtime Ray Tracing and Interactive Global Illumination," Dissertation Thesis, Jan. 21, 2004, pp. iii-xiv and pp. 3-297, Germany.

Wald et al., "SIMD Ray Stream Tracing—SIMD Ray Traversal with Generalized Ray Packets and On-the-fly Re-Ordering," SCI Institute Technical Report, UUSCI-2007-012, Aug. 2, 2007, pp. 1-8, Salt Lake City, Utah.

Yoon, S. E. et al., Cache-Oblivious Mesh Layouts, ACM Transaction on Graphics, SIGGRAPH 2005, Apr. 28, 2005, pp. 886-893 USA.

Zagha, M. et al., Radix Sort for Vector Multiprocessors, Proceedings of the 1991 ACM/IEEE Conference on Supercomputing, Nov. 1991, pp. 712-721, New York, NY, USA.

Final Office Action from U.S. Appl. No. 11/950,193 dated Jul. 22, 2011.

U.S. Appl. No. 12/333,244, filed Dec. 11, 2008.

Notice of Allowance from U.S. Appl. No. 11/938,091, dated Aug. 24, 2011.

Advisory Action from U.S. Appl. No. 11/950,193, dated Oct. 3, 2011.

Advisory Action from U.S. Appl. No. 11/950,245, dated Aug. 16, 2011.

Examiner's Answer from U.S. Appl. No. 11/862,938, dated Aug. 17, 2011.

Decision on Rejection from Chinese Patent Application No. 200810172720.0, dated Sep. 23, 2011.

Non-Final Office Action from U.S. Appl. No. 12/333,244, dated Jun. 1, 2012.

Notice of Allowance from U.S. Appl. No. 11/927,159, dated May 10, 2012.

Notice of Allowance from U.S. Appl. No. 11/927,099, dated Jun. 27, 2012.

* cited by examiner

FIGURE 4

SYSTEM, METHOD, AND COMPUTER PROGRAM PRODUCT FOR CONVERTING A SCAN ALGORITHM TO A SEGMENTED SCAN ALGORITHM IN AN OPERATOR-INDEPENDENT MANNER

RELATED APPLICATION(S)

The present application is a continuation-in-part of the commonly owned U.S. patent application filed Dec. 4, 2007, under Ser. No. 11/950,245, which is incorporated herein by reference in its entirety for all purposes.

FIELD OF THE INVENTION

The present invention relates to scan operations, and more particularly to performing scan operations using a parallel processing architecture.

BACKGROUND

Parallel processor architectures are commonly used to perform a wide array of different computational algorithms. An example of an algorithm that is commonly performed using such architectures is a scan operation (e.g. "all-prefix-sums" operation, etc.). One such scan operation is defined in Table 1.

TABLE 1

| $[I, a_0, (a_0 \oplus a_1), \ldots, (a_0 \oplus a_1 \oplus \ldots \oplus a_{n-1})]$ |
| --- |

Specifically, given an array $[a_0, a_1, \ldots, a_{n-1}]$ and "I" being an identity element for the operator, the array of Table 1 is returned. For example, if the operator "$\oplus$" is an addition operator, performing the scan operation on the array [3 1 7 0 4 1 6 3] would return [0 3 4 11 11 15 16 22], and so forth. While an addition operator is set forth in the above example, such operator may be any binary associative operator that operates upon two operands. Because of the wide applicability of scan operations, there is a continued need to more efficiently perform computational algorithms such as scan operations using parallel processor architectures.

SUMMARY

A system, method, and computer program product are provided for converting a scan algorithm to a segmented scan algorithm in an operator independent manner. In operation, a scan algorithm and a limit index data structure are identified. Utilizing the limit index data structure, the scan algorithm is converted to a segmented scan algorithm in an operator-independent manner. Additionally, the segmented scan algorithm is performed to produce an output.

DETAILED DESCRIPTION

Figure 1A:
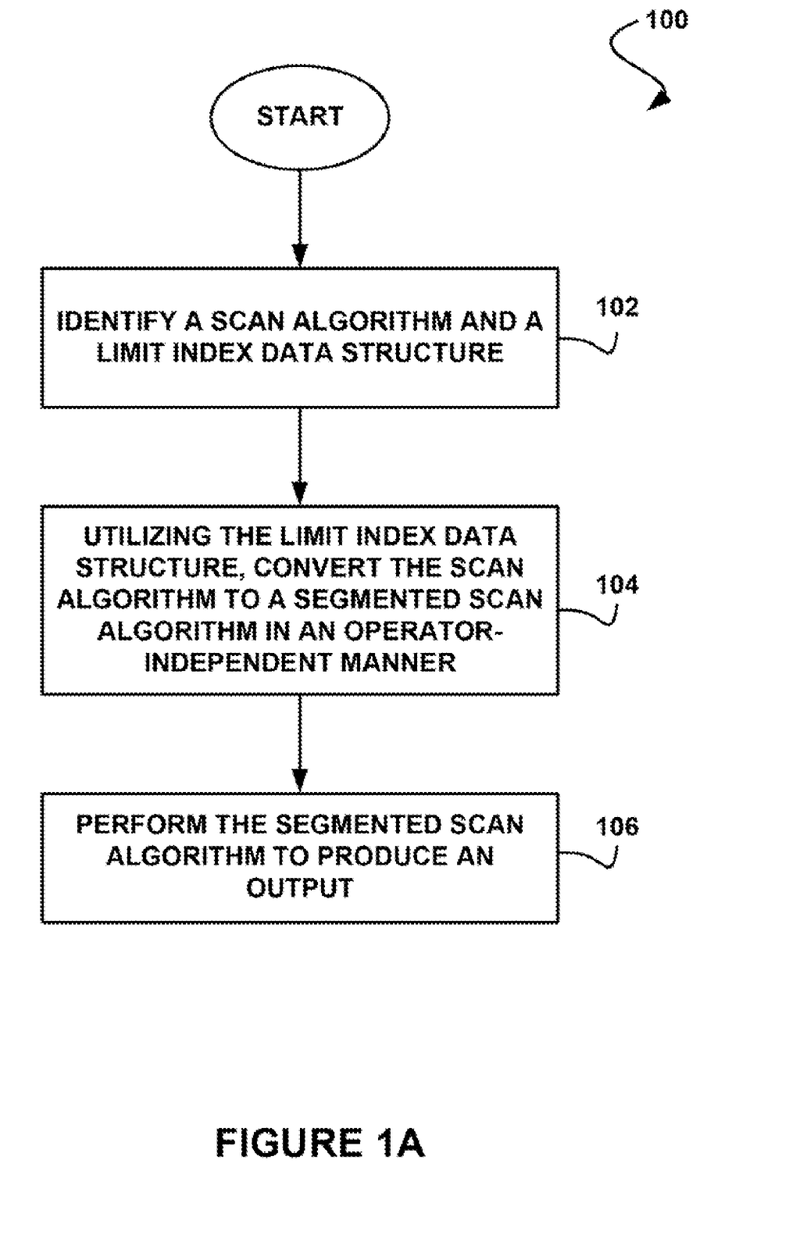
FIG. 1A shows a method for converting a scan algorithm to a segmented scan algorithm in an operator independent manner, in accordance with one embodiment.

FIG. 1A shows a method 100 for converting a scan algorithm to a segmented scan algorithm in an operator independent manner, in accordance with one embodiment. As shown, a scan algorithm and a limit index data structure are identified. See operation 102.

In the context of the present description, a scan algorithm refers to any algorithm capable being used to perform a scan operation on an array or a sequence of values. In this case, the scan operation may refer to any operation that involves a current element and at least one previous element of an array or a portion of an array. For example, in various embodiments, the scan operation may include a prefix sum scan operation, an exclusive scan operation, an inclusive scan operation, and/or any other scan operations (e.g. involving more or less elements and other operators, etc.).

Additionally, the scan operation may include a forward scan operation or a backward scan operation. In this case, a forward scan operation refers to any scan operation that operates from left to right across an array or sequence of values. A backward scan operation refers to any scan operation that operates from right to left across an array or sequence of values.

Furthermore, in the context of the present description, a limit index data structure refers to any data structure capable of indicating an index of a first or last element in an array or portion of an array including a particular element. For example, a sequence of values may be segmented such that the sequence is divided into more than one contiguous subsequence of values. In this case, for any element "i" in the subsequence, the limit index may include a first element (e.g. a minimum limit, etc.) of the subsequence including the element "i" (e.g. for a forward scan operation), or a last element (e.g. a maximum limit, etc.) of the subsequence including the element "i" (e.g. for a backward scan operation).

Utilizing the limit index data structure, the scan algorithm is converted to a segmented scan algorithm in an operator-independent manner. See operation 104. In the context of the present description, the segmented scan algorithm refers to any scan algorithm that is segmented (e.g. capable of being performed in parts, etc.). For example, in one embodiment, the segmented scan algorithm may include a scan algorithm capable of being performed on a subsequence of values. Furthermore, it should be noted that, because the scan algorithm is converted to the segmented scan algorithm in an operator-independent manner, the operator used for the scan operation may include any binary associative operator (e.g. an addition operator, a max operator, a min operator, etc.). In some cases, the operator used for the scan operation may include a non-associative operator, such as in a floating point addition operation, etc.

Additionally, the segmented scan algorithm is performed to produce an output. See operation 106. The segmented scan operation may include a forward segmented scan operation or backward segmented scan operation. In these cases, the limit index data structure may indicate a maximum limit and a minimum limit respectively.

Additionally, in one embodiment, a summation associated with the segmented scan operation may be limited to values associated with a subset of a predetermined number of parallel threads. In this case, the subset of the predetermined number of threads may be identified utilizing the limit index data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
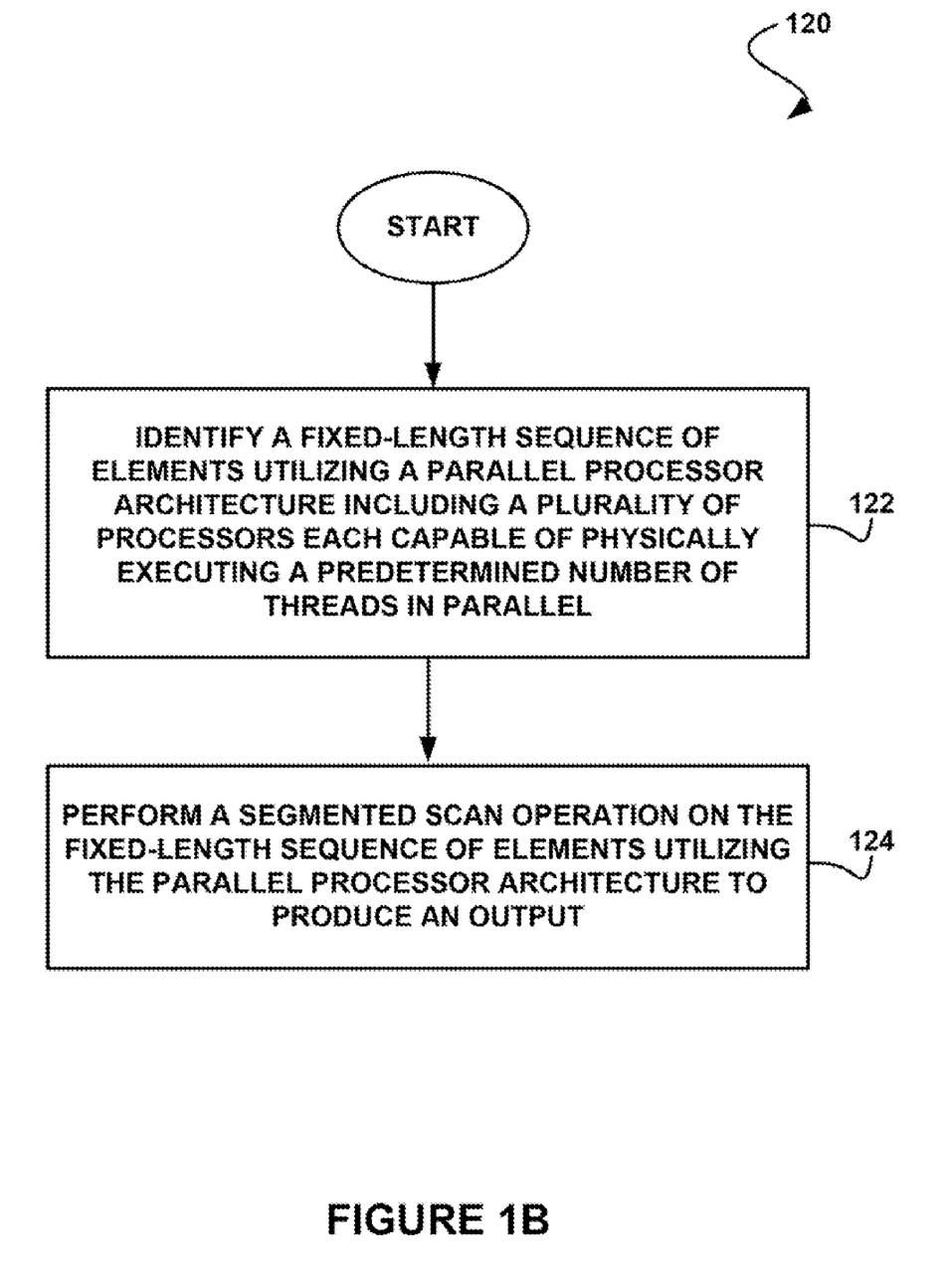
FIG. 1B shows a method for performing a segmented scan operation on a fixed-length sequence of elements utilizing the parallel processor architecture, in accordance with another embodiment.

FIG. 1B shows a method 120 for performing a segmented scan operation on a fixed-length sequence of elements utilizing the parallel processor architecture, in accordance with another embodiment. As an option, the present method 120 may be implemented in the context of the functionality of FIG. 1A. Of course, however, the method 120 may be carried out in any desired environment. It should also be noted that the aforementioned definitions may apply during the present description.

As shown, a fixed-length sequence of elements is identified utilizing a parallel processor architecture including a plurality of processors, each of the plurality of processors being capable of physically executing a predetermined number of threads in parallel, where the fixed-length corresponds with the predetermined number of threads. See operation 122. The fixed-length sequence of elements may include any sequence or array of elements of a fixed length. Additionally, in various embodiments, the fixed-length sequence of elements may correspond with the predetermined number of threads by the number of elements in the sequence being equal to the number of threads, or by the number of elements in the sequence being a multiple of the number of threads (e.g. a multiple of 2, 4, or a user defined multiple, etc.).

Furthermore, a segmented scan operation is performed on the fixed-length sequence of elements utilizing the parallel processor architecture to produce an output. See operation 124. In one embodiment, the threads may each execute a single instruction stream applied to their own corresponding data. Furthermore, a summation associated with the segmented scan operation may be limited to values associated with a subset of the predetermined number of threads. In this case, the subset of the predetermined number of threads may be identified utilizing an index data structure.

Figure 2:
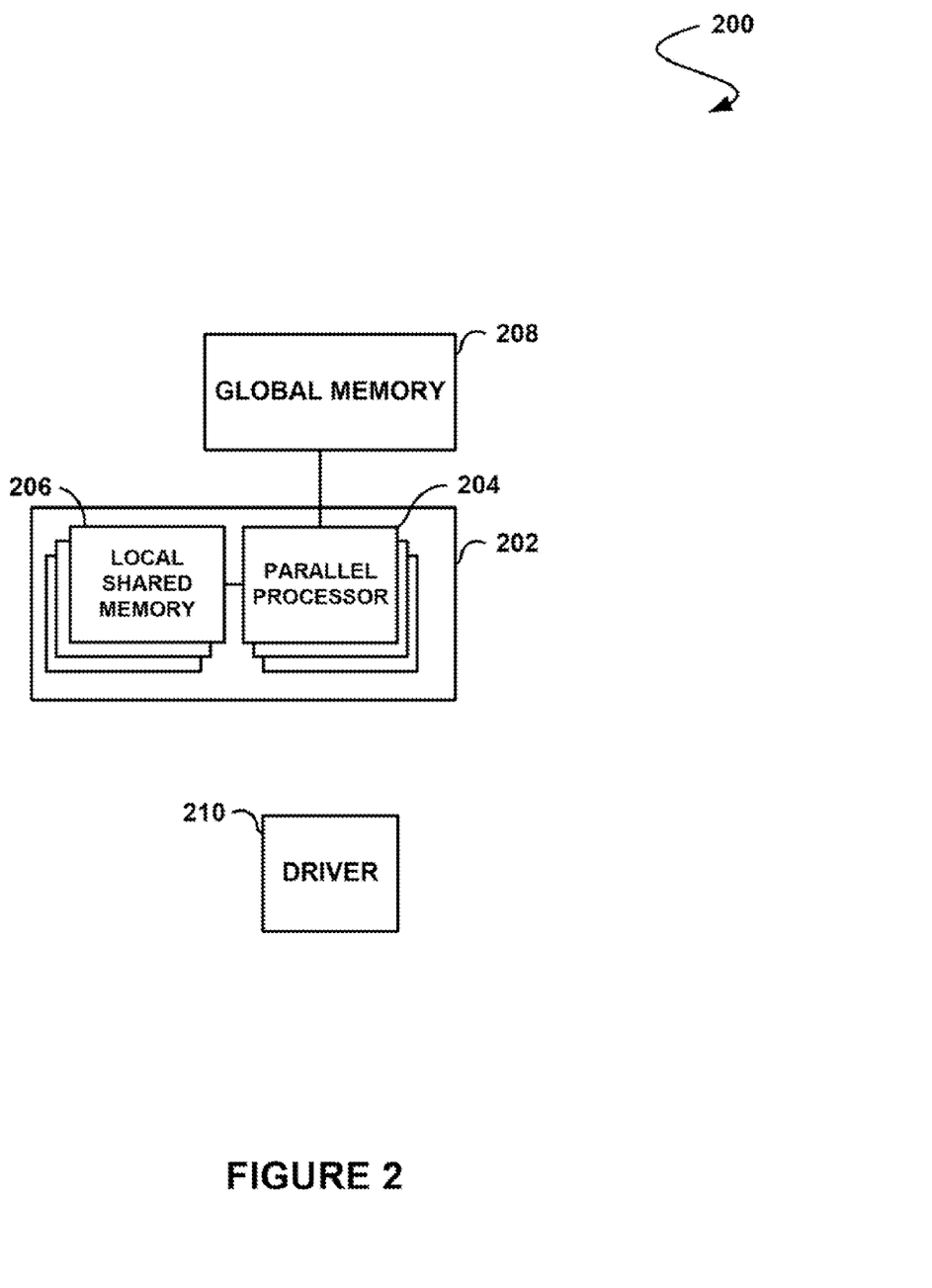
FIG. 2 shows a system for converting a scan algorithm to a segmented scan algorithm in an operator independent manner, in accordance with one embodiment.

FIG. 2 shows a system 200 for converting a scan algorithm to a segmented scan algorithm in an operator independent manner, in accordance with one embodiment. As an option, the present system 200 may be implemented to carry out the methods of FIGS. 1A-1B. Of course, however, the present system 200 may be implemented in any desired environment. Again, the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a SIMD architecture. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads may refer to the "warp size" of the corresponding processor.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the STI Cell Broadband Engine microprocessor architecture.

With continuing reference to FIG. 2, the parallel processing architecture 202 includes local shared memory 206. Each of the parallel processors 204 of the parallel processing architecture 202 may read and/or write to its own local shared memory 206. This shared memory 206 may consist of physically separate memories associated with each processor 204 or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver 210 may be provided in conjunction with the CUDA™ framework provided by NVIDIA Corporation. In operation, the driver 210 may be used for converting a scan algorithm to a segmented scan algorithm in an operator independent manner and/or for performing the segmented scan operation on a fixed-length sequence of elements.

The segmented scan operation is a well used data-parallel primitive. The segmented scan operation provides the basis for efficient parallel implementation of a wide range of algorithms, such as quicksort operations, and sparse matrix-vector multiplication operations, etc. More generally, the segmented scan operation may be utilized to implement nested data parallelism. In the context of the present description, nested data parallelism refers to any technique of converting (e.g. "flattening", "vectorizing", etc.) a recursively defined function (e.g. quicksort, etc.) into an efficient data-parallel algorithm.

Because of the wide applicability of the segmented scan operation, developing efficient implementations of segmented scan on top of parallel processing architecture frameworks (e.g. the CUDA™ framework, etc.) is useful, as this allows developers to write powerful algorithms much more conveniently. For example, segmented scan primitives that operate on arrays of arbitrary length may be constructed out of primitives operating on sequences of fixed length. More information regarding the construction of segmented scan primitives that operate on arrays of arbitrary length out of primitives operating on sequences of fixed length may be found in U.S. patent Ser. No. 11/950,245, filed Dec. 4, 2007, under the title "SYSTEM, METHOD, AND COMPUTER PROGRAM PRODUCT FOR CONSTRUCTING A PROCEDURE CAPABLE OF PERFORMING A SEGMENTED SCAN OPERATION ON A SEQUENCE OF ELEMENTS OF ARBITRARY LENGTH," which has been incorporated by reference in its entirety.

Using this technique for construction of segmented scan primitives, a block-level implementation of segmented scan may be utilized. In the context of the present description, a block refers to any contiguous group of elements that will be processed by a fixed group of threads (e.g. by a CUDA™ thread block, etc.). In one embodiment, warp-level kernels may be developed that may be combined to produce the block-level operation. As an option, the resulting segmented scan algorithm may be utilized for a GPU architecture.

Parallel scan, also known as parallel prefix sum, is a useful building block for data-parallel algorithms. Given a sequence "a" of "n" elements ($[a_0, a_1, \ldots, a_{n-1}]$) and a binary associative operator $\oplus$, the scan operator may compute the sequence shown in Expression 1.

$$\text{scan}(a, \oplus) = [a_0, (a_0 \oplus a_1), \ldots, (a_0 \oplus a_1 \oplus \ldots \oplus a_{n-1})] \quad \text{Expression 1}$$

As an example, the $\oplus$ operator may refer to an addition operator. Applying the scan to the input array [3 1 7 0 4 1 6 3] will produce the sequence of partial sums [3 4 11 11 15 16 22 25]. This scan operator is an inclusive scan, in the sense that element "i" of the output sequence incorporates the element of the $a_i$ input. Incorporating only previous elements would yield an exclusive scan operator.

The serial implementation of this operation is a loop that iterates once over the entire sequence. Table 2 shows code for an implementation of the inclusive scan operation in a loop that iterates once over the entire sequence, in accordance with one embodiment.

TABLE 2

```
template<class T>
T plus_scan(T *x, unsigned int n)
{
    for(unsigned int i=1; i<n; ++i)
        x[i] = x[i-1] + x[i];
}
```

As an option, an equivalent operation may be implemented in parallel efficiently by building a tree of partial sums over the sequence. Table 3 shows a CUDA™ implementation of a per-warp scan based on an algorithm for building a tree of partial sums over a sequence, in accordance with one embodiment.

TABLE 3

```
template<class OP, ScanKind Kind, class T>
_device_ T scan_warp(T *ptr, const unsigned int idx=threadIdx.x)
{
    const unsigned int lane = idx&31;
    if (lane >= 1) ptr[idx] = OP(ptr[idx - 1] , ptr[idx]);
    if (lane >= 2) ptr[idx] = OP(ptr[idx - 2] , ptr[idx]);
    if (lane >= 4) ptr[idx] = OP(ptr[idx - 4] , ptr[idx]);
    if (lane >= 8) ptr[idx] = OP(ptr[idx - 8] , ptr[idx]);
    if (lane >= 16) ptr[idx] = OP(ptr[idx - 16] , ptr[idx]);
    if( Kind==inclusive ) return ptr[idx];
    else return (lane>0) ? ptr[idx-1] : IDENTITY;
}
```

With respect to Table 3, it is assumed that there is one thread corresponding to each element of an array "ptr[ ]" and that the procedure is executed by a warp containing 32 threads. The procedure may be instantiated with any binary associative operator "OP" and it may be assumed that an appropriate "IDENTITY" value is defined. The value may be defined utilizing additional template parameters, for example.

A very similar kernel may perform a reverse scan. In this case, a reverse scan refers to a scan that proceeds from right-to-left rather than left-to-right as a forward scan does. Table 4, shows a corresponding CUDA™ kernel for per-warp reverse scan, in accordance one embodiment.

TABLE 4

```
template<class OP, ScanKind Kind, class T>
_device_ T rscan_warp(T *ptr, const unsigned int idx=threadIdx.x)
{
    const unsigned int lane = idx&31;
    if (lane < 31) ptr[idx] = OP(ptr[idx + 1] , ptr[idx]);
    if (lane < 30) ptr[idx] = OP(ptr[idx + 2] , ptr[idx]);
    if (lane < 28) ptr[idx] = OP(ptr[idx + 4] , ptr[idx]);
    if (lane < 24) ptr[idx] = OP(ptr[idx + 8] , ptr[idx]);
    if (lane < 16) ptr[idx] = OP(ptr[idx +16] , ptr[idx]);
    if( Kind==inclusive ) return ptr[idx];
    else return (lane<31) ? ptr[idx+1] : IDENTITY;
}
```

Information regarding combining warp-level scans together into block-level scans may be found in U.S. patent application Ser. No. 11/862,938, filed Sep. 27, 2007, under the title "SYSTEM, METHOD AND COMPUTER PROGRAM PRODUCT FOR PERFORMING A SCAN OPERATION," which is incorporated herein by reference in its entirety. Using the above framework, a scan algorithm may be converted to a segmented scan algorithm in an operator independent manner.

As an example, if a sequence "a" is segmented into subsequences, where a=[[3 1] [7 0 4] [1 6 3]], "a" may be represented as an array of values and an array of head flags. In this case, a head flag of "1" may be used to indicate the start of a new subsequence. Table 5 shows an array of values and an array of head flags, in accordance with this example.

TABLE 5

| a.values | [3 1 7 0 4 1 6 3] |
|---|---|
| a.flags | [1 0 1 0 0 1 0 0] |

It should be noted that other representations of the segmentation may also be utilized. For instance, in one embodiment, a corresponding subsequence count may be recorded for each element. With further reference to the above example, the segmented scan applied to "a," with an addition operator, yields [[3 4] [7 7 11] [1 7 10]]=segscan (a, +). Table 6, shows code for efficiently performing both a forward segmented scan across a single warp of threads, in accordance with one embodiment.

TABLE 6

```
template<class OP, ScanKind Kind, class T>
_device_ T segscan_warp(T *ptr, flag_type *hd,
                    const unsigned int idx = threadIdx.x)
{
    const unsigned int lane = idx&31;
    // (1) Convert head flags to min_indices form
    if ( hd[idx] ) hd[idx] = lane;
    flag_type mindex = scan_warp<op_max, inclusive>(hd);
```

TABLE 6-continued

```
// (2) Perform segmented scan across warp of size 32
if( lane >= mindex + 1 ) ptr[idx] = OP(ptr[idx – 1] , ptr[idx]);
if( lane >= mindex + 2 ) ptr[idx] = OP(ptr[idx – 2] , ptr[idx]);
if( lane >= mindex + 4 ) ptr[idx] = OP(ptr[idx – 4] , ptr[idx]);
if( lane >= mindex + 8 ) ptr[idx] = OP(ptr[idx – 8] , ptr[idx]);
if( lane >= mindex +16 ) ptr[idx] = OP(ptr[idx –16] , ptr[idx]);
if( Kind==inclusive )
    return ptr[idx];
else // Kind==exclusive
    return (lane>0 && mindex!=lane) ? ptr[idx–1] : IDENTITY;
}
```

As shown in Table 6, a limit index value, "mindex," is used to limit a range of summation. Rather than summing values held by all threads with a lower index, the summation may only accumulate values from threads with an index greater than or equal to mindex. In this case, mindex refers to the minimum index over which to sum.

In operation, the head flags array is converted into a limit index value form (e.g. mindex form, etc.). In this code example, this is accomplished by determining whether the head flag is "1" in the head flags array and, if so, writing the value of the index (i.e. "lane") to the array. Table 7 shows a result of this operation, in accordance with the above example.

TABLE 7

| a.values | [3 1 7 0 4 1 6 3] |
|---|---|
| a.flags | [1 0 1 0 0 1 0 0] |
| a.header_index | [0 0 2 0 0 5 0 0] |

Subsequently, an operation is performed on the header index to create the limit index form. It should be noted that the operation may be implemented utilizing any suitable operator. In this case, the operation includes utilizing a max operator. Thus, the header index is scanned from left to right and the maximum value encountered is stored in a mindex array. Table 8 shows a result of this operation, in accordance with the above example.

TABLE 8

| a.values | [3 1 7 0 4 1 6 3] |
|---|---|
| a.flags | [1 0 1 0 0 1 0 0] |
| a.header_index | [0 0 2 0 0 5 0 0] |
| mindex | [0 0 2 2 2 5 5 5] |

In this way, every thread in a warp is labeled by the index of the thread that begins a subsequence. At this point, the segmented scan may be performed across a warp of any size. It should be noted that the segmented scan may include any suitable operation (e.g. an addition operation, a max operation, etc.).

As part of the scan, it is also determined whether the segmented scan is an inclusive or exclusive scan. If the scan is an inclusive scan, the calculated inclusive scan value is returned. If the scan is an exclusive scan, the value to the left of the inclusive value is returned.

Implementing a reverse segmented scan primitive is similar to implementing a forward scan primitive, as noted above. In the reverse segmented scan implementation, a limit index value, "maxdex," is computed to limit the range of summation above, rather than below, the current thread index. In this case, maxdex refers to the maximum index over which to sum. Table 9 shows code for a reverse segmented scan implementation, in accordance with one embodiment.

TABLE 9

```
template<class OP, ScanKind Kind, class T>
_device_ device T rsegscan_warp(T *ptr, flag_type *hd,
                const unsigned int idx = threadIdx.x)
{
    const unsigned int lane = idx&31;
    // (1) Convert head flags to min_indices form
    if( hd[idx] ) hd[idx] = lane;
    else hd[idx] = 32;
    flag_type maxdex = rscan_warp<op_min, inclusive>(hd);
    // (2) Perform backward segmented scan across warp of size 32
    if( (lane + 1) < maxdex ) ptr[idx] = OP(ptr[idx + 1] , ptr[idx]);
    if( (lane + 2) < maxdex ) ptr[idx] = OP(ptr[idx + 2] , ptr[idx]);
    if( (lane + 4) < maxdex ) ptr[idx] = OP(ptr[idx + 4] , ptr[idx]);
    if( (lane + 8) < maxdex ) ptr[idx] = OP(ptr[idx + 8] , ptr[idx]);
    if( (lane +16) < maxdex ) ptr[idx] = OP(ptr[idx +16] , ptr[idx]);
    if( Kind==inclusive )
        return ptr[idx];
    else
        return (lane<31 && maxdex!=(lane+1)) ? ptr[idx+1] : IDENTITY;
}
```

As an option, the segmented scan kernels depicted in Tables 8 and 9 and/or the underlying methods for creating such segmented scan kernels, may be utilized in conjunction with the functionality for building intra-block segmented scan kernels from intra-warp scan kernels, as described in U.S. patent Ser. No. 11/950,245, filed Dec. 4, 2007, under the title "SYSTEM, METHOD, AND COMPUTER PROGRAM PRODUCT FOR CONSTRUCTING A PROCEDURE CAPABLE OF PERFORMING A SEGMENTED SCAN OPERATION ON A SEQUENCE OF ELEMENTS OF ARBITRARY LENGTH," which has been incorporated by reference in its entirety. This allows segmented scan kernels to be constructed that are capable of performing a segmented scan across all threads of a block and that are also capable of performing a segmented scan across arrays of arbitrary size using a large pool of blocks.

It should be noted that the preceding code is shown by way of example only. In various embodiments, such segmented scan may be implemented utilizing various other algorithms and/or code combinations. Furthermore, any number of parallel threads of fixed size may utilize the algorithms/techniques described herein.

Figure 3:
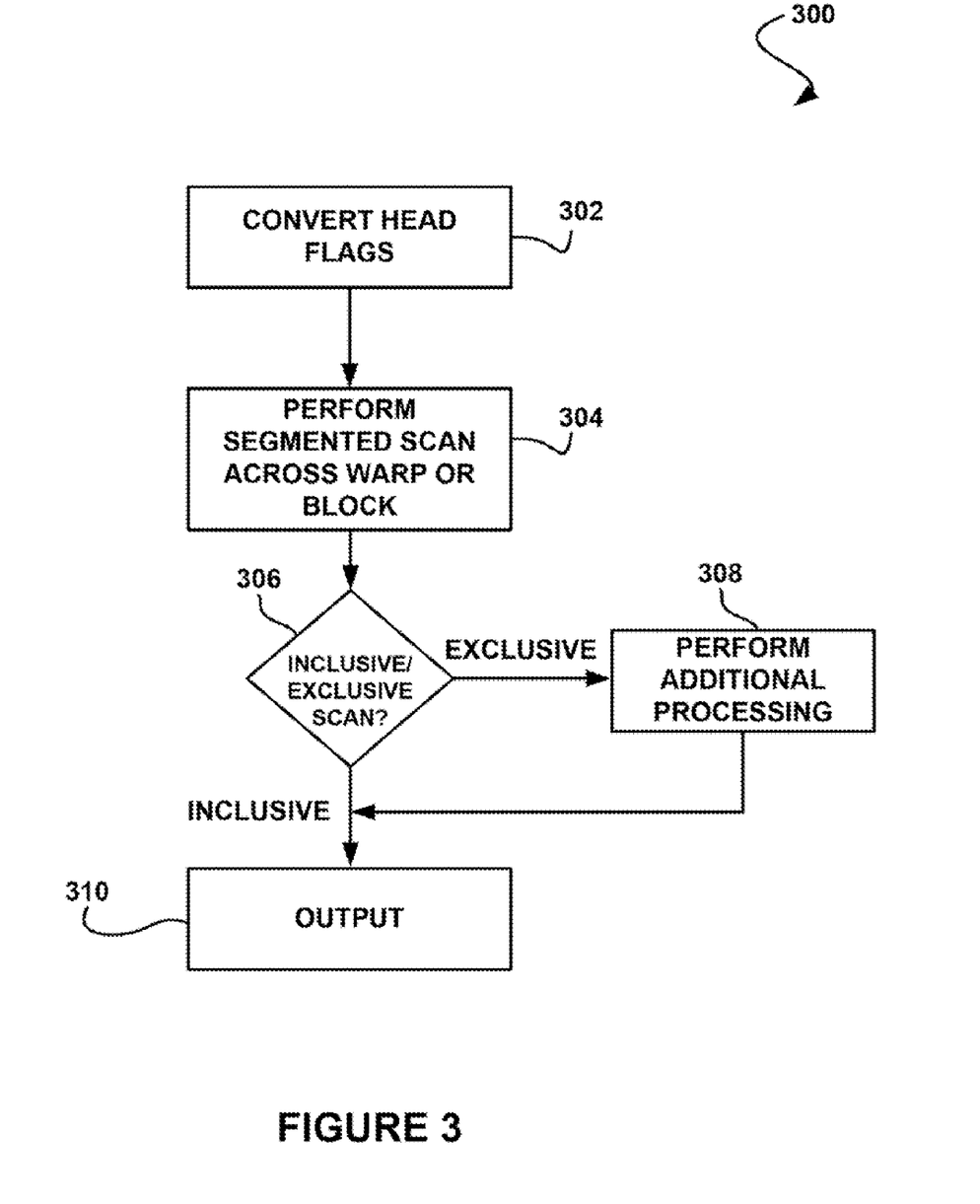
FIG. 3 shows a method for converting a scan algorithm to a segmented scan algorithm in an operator independent manner, in accordance with another embodiment.

FIG. 3 shows a method 300 for converting a scan algorithm to a segmented scan algorithm in an operator independent manner, in accordance with another embodiment. As an option, the present method 300 may be implemented in the context of the functionality and architecture of FIGS. 1A-2. Of course, however, the method 300 may be carried out in any desired environment. Further, the aforementioned definitions may apply during the present description.

As shown, a head flags array is converted into a limit index data structure (e.g. a minimum or maximum indices form, etc.). See operation 302. In this case, the limit index data structure may be used to indicate the minimum or maximum index over which to sum for a segmented scan operation, depending on whether a forward scan or a backward scan is to be implemented.

The segmented scan operation is then performed across a warp, block, or any fixed length group of elements. See operation 304. It is then determined whether the segmented scan is an inclusive scan or an exclusive scan. See operation 306.

If the segmented scan is an exclusive segmented scan, additional processing is preformed. See operation 308. In this case the additionally processing may include determining a result of the segmented scan operation that is immediately to the left (e.g. for a forward scan, etc.) or immediately to the right (e.g. for a backward scan). Once the additional processing is complete, or if the segmented scan is an inclusive segmented scan, a result is then output. See operation 310.

Figure 4:
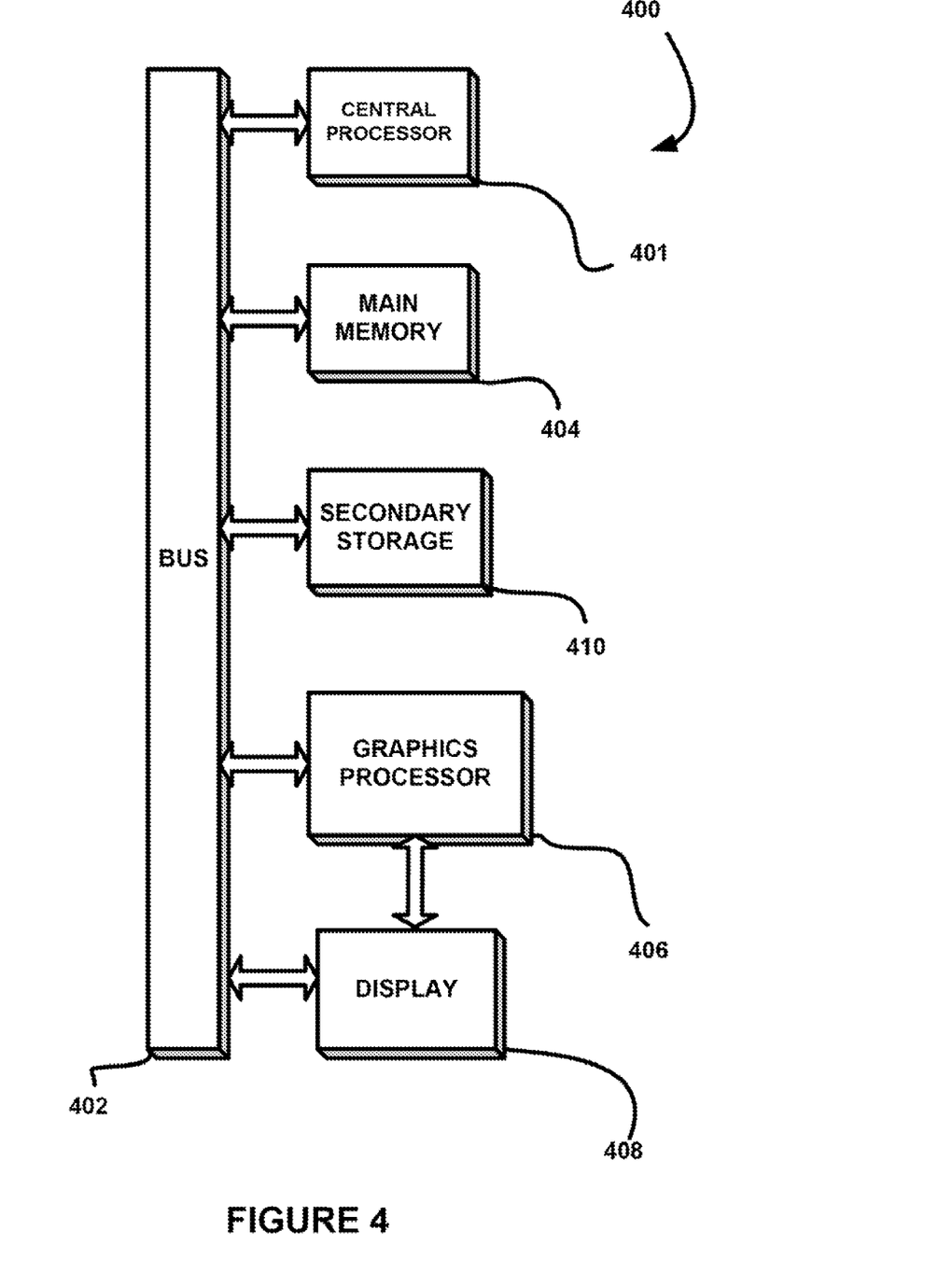
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices including, but not limited to, a personal digital assistant (PDA) device, a mobile phone device, a television, etc.

Further, while not shown, the system 400 may be coupled to a network (e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a fixed-length sequence of elements utilizing a parallel processor architecture including a plurality of processors, each of the plurality of processors being capable of physically executing a predetermined number of threads in parallel, where the fixed-length corresponds with the predetermined number of threads, each element in the fixed-length sequence of elements corresponding to a unique index value reflecting a position of the corresponding element within the fixed-length sequence;
generating a first array of head flags based on the fixed-length sequence of elements, each element of the first array of head flags comprising one of a first value or a second value, and each element of the first array of head flags corresponding to an element in the fixed-length sequence of elements and the unique index value reflecting a position of the corresponding element within the fixed-length sequence of elements;
generating a second array header index based on the first array of head flags and the unique index values, wherein each element of the second array header index is:
set to the first value if a corresponding element in the first array of head flags comprises the first value, and
set to a value of a unique index value reflecting a position of the corresponding element in the first array of head flags if the corresponding element in the first array of head flags comprises the second value;
generating a third array limit index by scanning the second array header index and applying a max operator, wherein the third array limit index comprises a plurality of elements and each element in the third array limit index corresponds to an element in the fixed-length sequence of elements and a corresponding element of the second array header index; and
performing a segmented scan operation on the fixed-length sequence of elements utilizing the parallel processor architecture and the third array limit index to produce an output.

2. The method of claim 1, wherein the predetermined number of threads each execute a single instruction stream applied to their own corresponding data.

3. The method of claim 1, wherein the parallel processor architecture includes a graphics processor.

4. The method of claim 1, wherein the segmented scan operation includes a forward segmented scan operation.

5. The method of claim 1, wherein the segmented scan operation includes a backward segmented scan operation.

6. The method of claim 1, wherein a summation associated with the segmented scan operation is limited to values associated with a subset of the predetermined number of threads.

7. The method of claim 6, wherein the subset of the predetermined number of threads is identified utilizing the third array limit index.

8. The method of claim 6, wherein the summation associated with the segmented scan operation is limited to values associated with the subset of the predetermined number of threads such that the summation only accumulates values from at least two threads of the predetermined number of threads associated with a unique index value that is greater than or equal to a value of a corresponding element of the third array limit index.

9. The method of claim 6, wherein the summation associated with the segmented scan operation is limited to values associated with the subset of the predetermined number of threads such that the summation only accumulates values from at least two threads of the predetermined number of threads associated with a unique index value that is less than or equal to a value of a corresponding element of the third array limit index.

10. The method of claim 7, wherein the third array limit index indicates a maximum index.

11. The method of claim 7, wherein the third array limit index indicates a minimum index.

12. The method of claim 1, wherein each of the elements comprising the second value in the first array of head flags indicates that the corresponding element within the fixed-length sequence of elements begins a new subsequence within the fixed-length sequence of elements, and wherein the segmented scan is performed on each subsequence within the fixed-length sequence of elements.

13. The method of claim 12, wherein the third array limit index is generated by scanning the second array header index and, for each element of the third array limit index, storing as a value for the element of the third array limit index a maximum value encountered up to the corresponding element of the second array header index, such that each thread of the predetermined number of threads is associated with a unique index value corresponding to a thread that begins its subsequence.

14. A method, comprising:
    identifying a scan algorithm;
    generating a first array of head flags based on a fixed-length sequence of elements, each element of the first array of head flags comprising one of a first value or a second value, and each element of the first array of head flags corresponding to an element in the fixed-length sequence of elements and a unique index value reflecting a position of the corresponding element within the fixed-length sequence of elements;
    generating a second array header index based on the first array of head flags and the unique index values, wherein each element of the second array header index is:
        set to the first value if a corresponding element in the first array of head flags comprises the first value, and
        set to a value of a unique index value reflecting a position of the corresponding element in the first array of head flags if the corresponding element in the first array of head flags comprises the second value;
    generating a third array limit index by scanning the second array header index and applying a max operator, wherein the third array limit index comprises a plurality of elements and each element in the third array limit index corresponds to an element in the fixed-length sequence of elements and a corresponding element of the second array header index;
    utilizing the third array limit index, converting the scan algorithm to a segmented scan algorithm in an operator-independent manner; and
    performing the segmented scan algorithm to produce an output.

15. The method of claim 14, wherein the segmented scan algorithm includes a forward segmented scan operation.

16. The method of claim 14, wherein the segmented scan algorithm includes a backward segmented scan operation.

17. The method of claim 14, wherein a summation associated with the segmented scan algorithm is limited to values associated with a subset of the predetermined number of threads.

18. The method of claim 17, wherein the subset of the predetermined number of threads is identified utilizing the third array limit index.

19. The method of claim 18, wherein the third array limit index indicates a maximum limit.

20. The method of claim 18, wherein the third array limit index indicates a minimum limit.

21. An apparatus, comprising:
    a parallel processor architecture including a plurality of processors for:
        identifying a fixed-length sequence of elements and for performing a segmented scan operation on the fixed-length sequence of elements to produce an output, each element in the fixed-length sequence of elements corresponding to a unique index value reflecting a position of the corresponding element within the fixed-length sequence,
        generating a first array of head flags based on the fixed-length sequence of elements, each element of the first array of head flags comprising one of a first value or a second value, and each element of the first array of head flags corresponding to an element in the fixed-length sequence of elements and the unique index value reflecting a position of the corresponding element within the fixed-length sequence of elements,
        generating a second array header index based on the first array of head flags and the unique index values, wherein each element of the second array header index is:
            set to the first value if a corresponding element in the first array of head flags comprises the first value, and
            set to a value of a unique index value reflecting a position of the corresponding element in the first array of head flags if the element in the first array of head flags comprises the second value,
        generating a third array limit index by scanning the second array header index and applying a max operator, wherein the third array limit index comprises a plurality of elements and each element in the third array limit index corresponds to an element in the fixed-length sequence of elements and a corresponding element of the second array header index;
    wherein each of the plurality of processors is capable of physically executing a predetermined number of threads in parallel and the fixed-length corresponds with the predetermined number of threads.

22. The apparatus of claim 21, wherein the plurality of processors remain in communication with memory and a display via a bus.

* * * * *